United States Patent
Frey, Jr.

(10) Patent No.: US 6,530,036 B1
(45) Date of Patent: Mar. 4, 2003

(54) SELF-HEALING COMPUTER SYSTEM STORAGE

(75) Inventor: Alexander H. Frey, Jr., Wayzata, MN (US)

(73) Assignee: Tricord Systems, Inc., Plymouth, MN (US)

(*) Notice: Subject to any disclaimer, the term of this patent is extended or adjusted under 35 U.S.C. 154(b) by 0 days.

(21) Appl. No.: 09/439,440

(22) Filed: Nov. 15, 1999

Related U.S. Application Data

(63) Continuation-in-part of application No. 09/375,909, filed on Aug. 17, 1999.

(51) Int. Cl.[7] .............................................. G06F 11/08
(52) U.S. Cl. ........................... 714/6; 707/202; 714/52; 714/764
(58) Field of Search ..................... 714/5, 6, 20, 52, 714/764, 722; 707/202

(56) References Cited

U.S. PATENT DOCUMENTS

| | | | |
|---|---|---|---|
| 4,604,750 A | * 8/1986 | Manton et al. ............... 714/48 |
| 4,722,085 A | 1/1988 | Flora et al. |
| 4,761,785 A | 8/1988 | Clark et al. |
| 4,817,035 A | 3/1989 | Timsit |
| 4,941,059 A | * 7/1990 | Grant ........................ 360/72.1 |
| 5,130,992 A | 7/1992 | Frey, Jr. et al. |
| 5,151,987 A | * 9/1992 | Abraham et al. ............. 714/20 |
| 5,390,327 A | 2/1995 | Lubbers et al. |
| 5,485,475 A | * 1/1996 | Takagi ........................... 707/1 |
| 5,522,031 A | 5/1996 | Ellis et al. |
| 5,524,204 A | 6/1996 | Verdoorn, Jr. |
| 5,574,882 A | 11/1996 | Menon et al. |
| 5,615,352 A | 3/1997 | Jacobson et al. |
| 5,623,595 A | 4/1997 | Bailey |
| 5,826,001 A | 10/1998 | Lubbers et al. |
| 5,875,456 A | 2/1999 | Stallmo et al. |

(List continued on next page.)

FOREIGN PATENT DOCUMENTS

| EP | 0 709 779 A2 | 5/1996 |
|---|---|---|
| WO | WO 97/22054 | 6/1997 |
| WO | WO 99/09479 | 2/1999 |

OTHER PUBLICATIONS

TRANSARC™ Website print–out: The AFS System In Distributed Computing Environment, IBM Transarc, Pittsburgh Pennsylvania, 10 pgs., not dated.

TRANSARC™ Website print–out: The AFS System In Distributed Computing Environments, Transarc Corporation, Pittsburgh, Pennsylvania, 8 pgs., May 1996.

(List continued on next page.)

Primary Examiner—Robert Beausoleil
Assistant Examiner—Gabriel Chu
(74) Attorney, Agent, or Firm—Wong, Cabello, Lutsch, Rutherford & Brucculeri, P.C.

(57) ABSTRACT

A self-healing computer storage system utilizes a proxy storage management process to service memory access requests directed to stored objects whose designated storage management process has failed. The proxy accesses the relevant parts of the stored objects fault tolerance information to service memory access requests, updating the stored object's fault tolerance information to reflect any changes. When the previously failed storage management process is restarted, it determines if the fault tolerance information for any of the objects (or parts thereof) it manages have been modified (i.e., by a proxy). If such indication is found, the restarting storage management process reconstructs its stored object data (and metadata) from the stored objects' fault tolerance information.

29 Claims, 13 Drawing Sheets

U.S. PATENT DOCUMENTS

| | | | |
|---|---|---|---|
| 5,875,457 A | | 2/1999 | Shilit |
| 5,933,592 A | | 8/1999 | Lubbers et al. |
| 5,933,834 A | | 8/1999 | Aichelen |
| 5,960,446 A | | 9/1999 | Schmuck et al. |
| 5,974,503 A | * | 10/1999 | Venkatesh et al. .......... 711/114 |
| 5,999,930 A | | 12/1999 | Wolff |
| 6,000,010 A | | 12/1999 | Legg |
| 6,021,463 A | | 2/2000 | Belser |
| 6,021,508 A | * | 2/2000 | Schmuck et al. ............. 714/20 |
| 6,029,168 A | | 2/2000 | Frey |
| 6,032,216 A | | 2/2000 | Schmuck et al. |
| 6,035,373 A | | 3/2000 | Iwata |
| 6,041,423 A | | 3/2000 | Tsukerman |
| 6,058,400 A | | 5/2000 | Slaughter |
| 6,092,215 A | * | 7/2000 | Hodges et al. ............... 711/114 |
| 6,173,291 B1 | * | 1/2001 | Jenevein ..................... 707/200 |
| 6,295,611 B1 | * | 9/2001 | Connor et al. ................ 714/15 |

OTHER PUBLICATIONS

Network Applicance, Inc. Website print–out: The Network Appliance Enterprise Storage Architecture: System and Data Availability, Michael J. Marchi, Andy Watson, Network Appliance, Inc., 11 pgs., Copyright 2000.

Paper: The Architecture of the High Performance Storage System (HPSS), Danny Teaff, Dick Watson, Bob Coyne, 24 pgs., not dated.

Paper: Scalability and Performance in Modern File Systems, Philip Trautman, Jim Mostek, 24 pgs., not dated.

Brochure: Foundation Suite™ VERITAS Volume Manager and VERITAS File System, Veritas Software Corporation, 4 pgs.; Copyright 1999.

The Design of the Postgres Storage System, Michael Stonebreaker, Proceedings of the $23^{rd}$ VLDB Conference, Brighton, pp. 289–300, 1987.

The Recovery Box: Using Fast Recovery to Provide High Availability in the UNIX Environment, Mary Baker, Mark Sullivan, Proceedings of the Summer 1992 USENIX Technical Conference, San Antonio, Texas; pp. 31–43; Jun. 1992.

Raid Technology: The Storage Solution; an nStor Report, 19 pages, not dated.

Net Engineer; RAID Technology, 5 pages, not dated.

Molina, Joe; The RAB Guide to Non–Stop Data Access, 17 pages, not dated.

* cited by examiner

SELF-HEALING COMPUTER SYSTEM STORAGE

RELATED APPLICATIONS

This is a continuation-in-part of application Ser. No. 09/375,909 entitled "Self-Healing Computer System Storage," filed Aug. 17, 1999.

BACKGROUND

The invention relates generally to computer system storage and more particularly to mechanisms (methods and devices) for providing access to objects stored on media managed by a failed storage access management process or device.

It is common for organizations to employ large numbers of computers for tasks such as data storage. Typically, some or all of an organization's computers may be interconnected to form a network whereby two or more computer systems are interconnected so that they are capable of exchanging information. With the adoption of computer network technology came the desire for increased storage capacity. Increased storage capacity, in turn, led to a need to distribute file systems across networked computers. In general, distribution of file systems is done by software applications that keep track of files stored across a network. One goal of distributing file systems is to allow a user/application of one computer (or node) in a computer network to access data or an application stored on another node in the computer network. Another goal of distributing file systems is to make this access transparent with respect to the stored object's physical location.

FIG. 1 shows a computer system employing distributed file system technology in accordance with the prior art. As shown, node-A 100 and node-B 102 are interconnected by communication link 104. Illustrative nodes include specialized or general purpose workstations and personal computers. An illustrative communication link employs coaxial or twisted pair cable and the transport control protocol (TCP). Each node A and B executes a local version of a distributed file system, 106 and 108 respectively. Each distributed file system manages the storage of objects to/from a storage unit (e.g., 110 and 112), each of which may include one or more storage devices. Illustrative storage devices include magnetic disks (fixed, floppy, and removable), magnetic tape units and optical media such as CD-ROM disks.

One well known distributed file system is the Network File System (NFS®) from Sun Microsystems, Incorporated of Palo Alto, Calif. In NFS®, a server node may make its file system (in part or in whole) shareable through a process known as "exporting." A client node may gain access to an exported file system through a process known as "mounting." Exporting entails specifying those file systems, or parts thereof, that are to be made available to other nodes (typically through NFS® map files). Mounting adds exported file systems to the file structure of a client node at a specified location. Together, the processes of exporting and importing define the file system namespace.

For example, consider FIG. 2 in which node 200 has local file system 202 including directories X, Y, and Z, and node 204 has local file system 206 including directories α, β, and γ. If node 204 exports, and node 200 imports file system 206 (often referred to as cross-mounting), node 200 may have combined system namespace 208. From directory structure 208, a user/application on node 200 may access any data object in remote directories α, β, and γ, as if α, β, and γ were local directories such as X, Y or Z.

One significant feature of distributed storage such as that illustrated in FIG. 2, is that all references to an object stored in directory a by a user at node 200 (i.e., through combined file system namespace 208) are resolved by the file system local to and executing on node 204. That is, the translation of an object's reference to the physical location of that object is performed by the file system executing on node 204. Another significant feature of current distributed file systems such as NFS® is that the processes of exporting and importing must be performed for each new directory to be shared. Yet another significant feature of current distributed file systems is that shared storage (e.g., mount points α, β, and γ) appear as discrete volumes or nodes in file system namespace. In other words, an exported file system (or part thereof) appear as one or more discrete objects in the namespace of each importing node. Thus, system namespace is fragmented across multiple storage nodes. To export a single directory from a node to all other nodes in a computer network, not only must the exporting node's map of objects (or its equivalent) be updated to specify the directory being exported, but every node wanting to import that directory must have its map of objects updated. This may happen frequently as, for example, when additional storage is added via a new storage node being attached to the network, and requires significant administrative overhead for each such occurrence. A corollary of the need to cross-mount shared directories is that if the node exporting a directory (directory α, for example) fails, all access to information stored at that node is lost until the node is restarted.

Thus, it would be beneficial to provide distributed storage mechanisms (methods and devices) that reduce administrative overhead associated with sharing memory, unify shared system namespace, and provide users access to data presumptively maintained by a failed storage access manager.

SUMMARY

In one embodiment the invention provides a method to process a memory access request by a distributed storage management process, where the memory access request is directed to a stored object having a data portion, a data fault tolerance portion, a metadata portion and a metadata fault tolerance portion. If the storage management process responsible for managing the stored object is not available, the method includes reconstructing at least a part of the metadata portion in accordance with metadata fault tolerance information, locating at least a part of the data fault tolerance portion based on the reconstructed metadata, reconstructing a part of the data portion corresponding to the located data fault tolerance part, modifying the reconstructed data part, modifying the data fault tolerance portion in accordance with the modified reconstructed data part, indicating (in the metadata fault tolerance portion) that the data fault tolerance portion has been modified, and modifying a contents object to indicate the metadata fault tolerance portion has been modified, wherein the contents object is associated with a second and distinct storage management process.

In another embodiment, the invention provides a method to initialize a storage management process that makes use of the modified data and metadata fault tolerance information. This method includes reconstructing a contents object (associated with the storage management process) based on a contents fault tolerance object, determining a value of an object-modified indicator in the reconstructed contents object (the object-modified indicator associated with a stored object), and reconstructing at least a part of the stored object's data portion based on at least a part of the stored object's data fault tolerance portion if the object-modified indicator has a first value.

Methods in accordance with the invention may be stored in any media that is readable and executable by a programmable control device such as a computer processor or custom designed state machine.

DETAILED DESCRIPTION

Techniques (including methods and devices) to provide computer system storage are described. The following embodiments of the invention are illustrative only and are not to be considered limiting in any respect.

Figure 3:
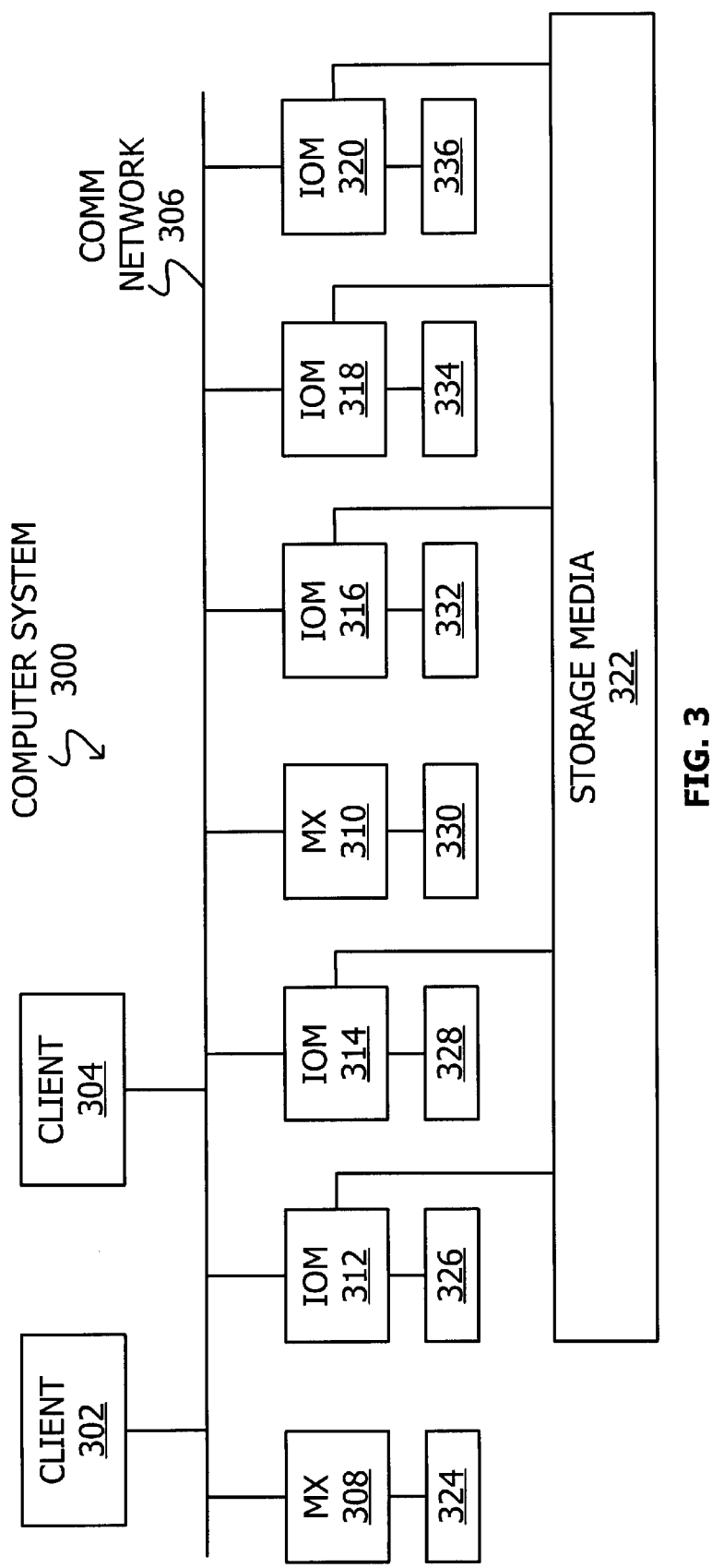
FIG. 3 shows a computer system having distributed system storage in accordance with one embodiment of the invention.

A computer system having distributed storage in accordance with one embodiment of the invention is shown in FIG. 3. As indicated, computer system 300 includes clients 302 and 304, communication network 306, memory translators (MXs) 308 and 310, input-output managers (IOMs) 312, 314, 316, 318, and 320, and storage media 322. In addition, each MX 308 and 310 and each IOM 312 through 320 has an associated data store, 324 through 336.

Clients 302 and 304 generate/initiate memory access transactions such as object create, object read, object write, and object delete operations. The term "object," as used herein, refers to any entity which may be assigned and accessed by a memory label (e.g., a filename, directory name or volume name). One illustrative object is a file object which may be defined as of a sequential array of records. Another illustrative object is a directory object which may be defined as of an ordered collection of records. In one embodiment, a directory may be a B-tree of records, the collection of all such records representing a global directory which may be physically stored on one or more storage devices. In one embodiment, a system directory (organized as a single file) is redundantly distributed across multiple storage devices. While the size of a record may be variable, a data file record is typically one byte (i.e., byte addressable) and a directory record is typically the size needed to store that information associated with a directory node (e.g., 1000 to 4000 bytes). Communication network 306 serves to interconnect the various system components. Illustrative communication networks may use any available protocol (e.g., the transport control protocol) and may be implemented using any suitable technology such as copper wire, infrared, fiber optic, microwave, or satellite communication technologies. Storage media 322 may include one or more storage devices such as, for example, magnetic disks (fixed, floppy, and removable), magnetic tape media and optical media such as CD-ROM disks.

Memory translators provide, among other things, two capabilities. First, each MX translates memory access commands between a client protocol, such as that used by an NFS® or Windows NT® based client, and a format that may be processed by one or more input-output managers. In this sense, a MX represents a client's point of access to system memory space embodied in storage media 322. In one embodiment, there may be as many MXs as there are types of client file systems. Second, each MX may obtain and/or retain an object's referential map. A referential map describes the association between an object and those input-output mangers at which at least a portion of the object is stored. Thus, input-output mangers represent logical storage units over which an object is distributed. (An object's master or primary referential map is maintained as part of the object's metadata which is accessed, possibly indirectly, through its directory entry.) In one embodiment, a MX may retain an object's referential map (to the extent possible in data storage 324 or 330, for example) if it performed a lookup operation on the object's label for a client (i.e., a filename-to-handle translation). In another embodiment, only that MX associated with an input-output manager storing an object's initial portion (e.g., an object's "start of file") retains the object's referential map.

In general, referential maps may be generated in accordance with any desired mapping function. In one embodiment, the referential mapping function may rely on the sequential identification of input-output managers in a striping fashion. Referential mapping information of this type may include: (1) identification of that input-output manager at which the object's first record is stored; (2) the number of input-output managers over which the object is distributed, referred to as the object's span; (3) indication of the lowest numbered input-output manager at which any portion of the object is stored; and (4) the quantum (e.g., number of bytes) of the object stored at each input-output manager. In another embodiment, the referential mapping function may be an explicit identification of those input-output managers at which at least an explicitly identified portion of an object is stored. Referential mapping information of this type may include: (1) identification of each input-output manager on which at least a portion of an object is stored; and (2) the quantum of the object stored at each of the identified input-output managers.

Figure 4:
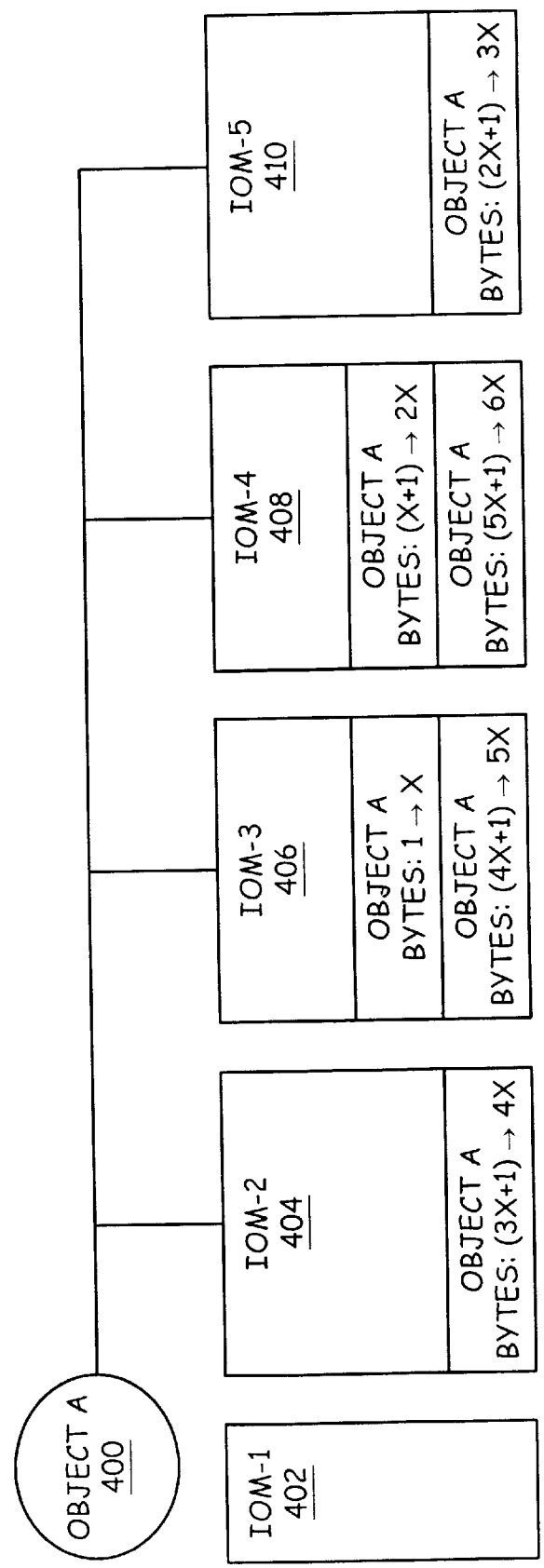
FIG. 4 shows a referential mapping of an object in accordance with one embodiment of the invention.

FIG. 4 illustrates the first technique in which object A 400 (being 6X bytes in length) is striped across four of a system's five input-output managers (IOM-2 404 through IOM-5 410) in quantum's of X bytes, beginning at IOM-3 404. In this example, object A's starter input-output manager is IOM-3 406; object A's span is 4; the lowest numbered input-output manager at which at least a portion of object A 400 is stored is IOM-2 404; and object A 400 is stored in quanta of X bytes. (Note, object A does not need to be an even multiple of X.)

Figure 1:
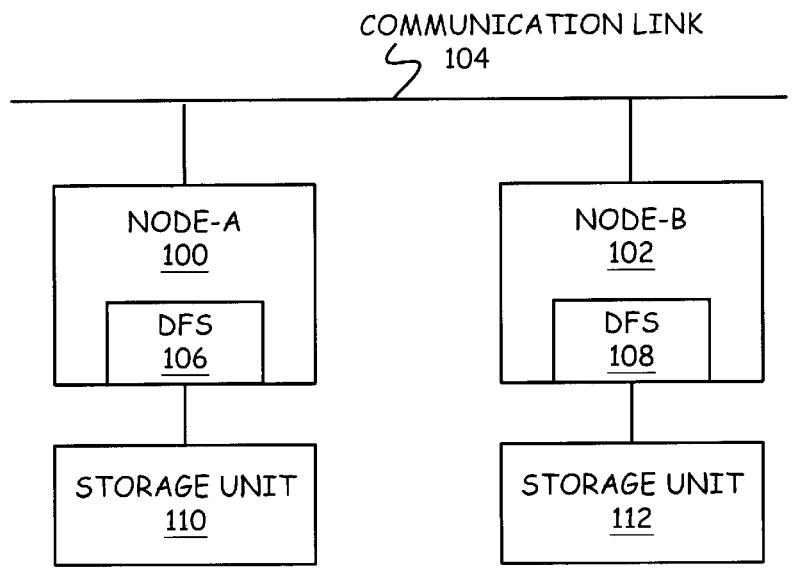
FIG. 1 shows an illustrative computer system employing prior art distributed file system technology.
Figure 2:
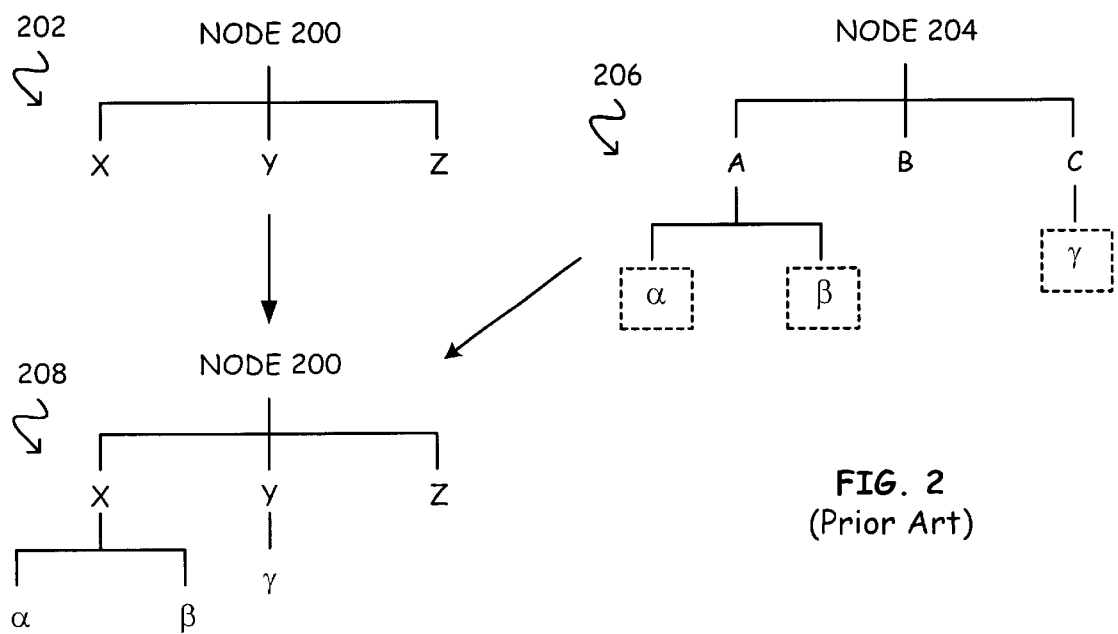
FIG. 2 illustrates how prior art distributed file systems manage shared storage.

It is significant to note that referential maps do not incorporate information specifying an object's physical storage location. That is, a MX does not have knowledge of or access to information describing how and where any portion of an object is physically stored. In contrast, prior art distributed file system command protocol translators (e.g., elements 106 and 108 in FIG. 1) generate and maintain mappings between an object's label (e.g., filename), the associated object reference (e.g., handle), and the physical storage locations allocated to the object. Because of this linkage between an object and its physical storage location at the file command translator level, prior art file systems do not distribute an object across a plurality of processors (that is, physical memory managed by two or more processes executing on two or more processors).

Figure 5:
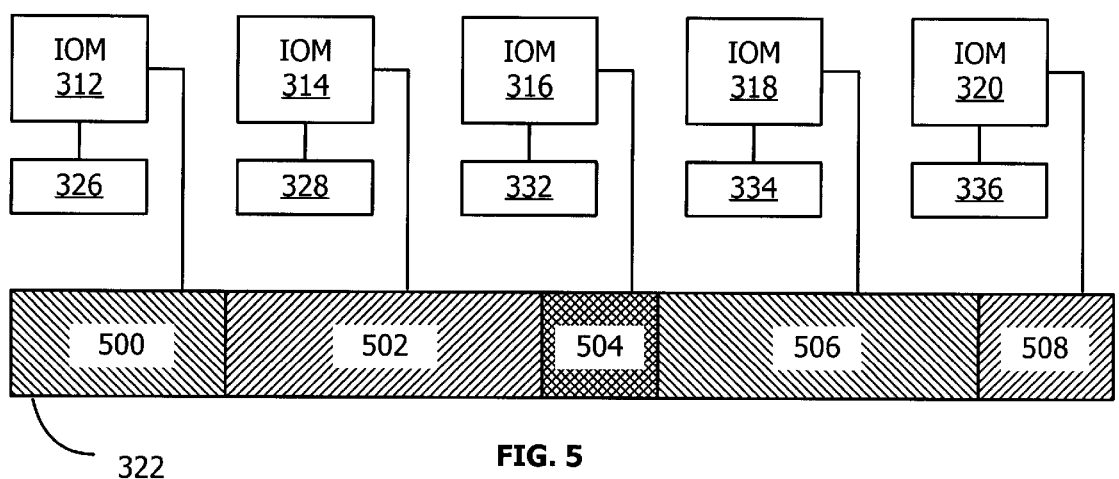
FIG. 5 shows how input-output managers may be mapped to various portions of system storage media in accordance with one embodiment of the invention.

Input-output managers manage a specified portion of system memory embodied in storage media 322. Referring to FIG. 5 for example, IOM 312 may manage memory space 500, IOM 314 may manage memory space 502, and so forth. Each of memory spaces 500 through 508 may span one or more physical storage devices, portions of one or more physical storage devices, or any combination thereof. As additional memory (i.e., storage devices) is added to computer system 300, the new memory may be managed by one or more existing IOMs, one or more additional (new) IOMs, or any combination of new and existing IOMs.

More specifically, IOMs manage the storage of portions of objects to physical memory. To this end, each IOM generates and maintains physical maps. A physical map describes the association between at least a portion of an object managed by an IOM and the physical memory allocated to those object portions by the IOM. In addition, if an IOM manages the physical storage of only a portion of an object, the IOM may generate and maintain information identifying those IOMs which manage the object's other portions. This latter information may be used by IOMs to facilitate the storage, retrieval, and manipulation of objects distributed across multiple IOMs. It is significant that an IOM generates and maintains physical maps for only those portions of objects for which it manages physical storage.

Partitioning an object's storage access information into independent referential and physical maps in accordance with the invention provides many significant benefits. One benefit is that referential maps may be generated at object creation time and thereafter left unchanged. The unchanging nature of referential maps makes them an ideal type of information to globally distribute (e.g., to all clients). Another benefit of separating storage access information into referential maps and physical maps allows the details of an object's physical storage (i.e., its location) to be completely disassociated from the object's addressability via its label or handle. This, in turn, may provide clients with a unified view of system namespace; clients may access an object through a constant and consistent reference without the need (or ability) to know where or how an object is physically stored. Yet another benefit of separate referential and physical maps in accordance with the invention is that each IOM maintains only those physical maps for those portions of objects for which it manages physical memory. Because different IOMs may be associated with—or executed by—different processors, separation of storage access information into referential maps and physical maps provides a mechanism to distribute objects across multiple processors. The ability to distribute objects across multiple processors, in turn, may contribute significantly to the expandability of a distributed storage system in accordance with the invention. Distribution of objects across multiple processors also allows each portion of an object to be accessed independently of any other portion of an object.

The independence between different portions of a stored object also allows the use of a stand-in storage access manager (e.g., IOM) to compensate, at runtime, for a failed storage access manager. This, in turn, provides a computer storage system in accordance with the invention with a self-healing capability as discussed more fully below.

Figure 6:
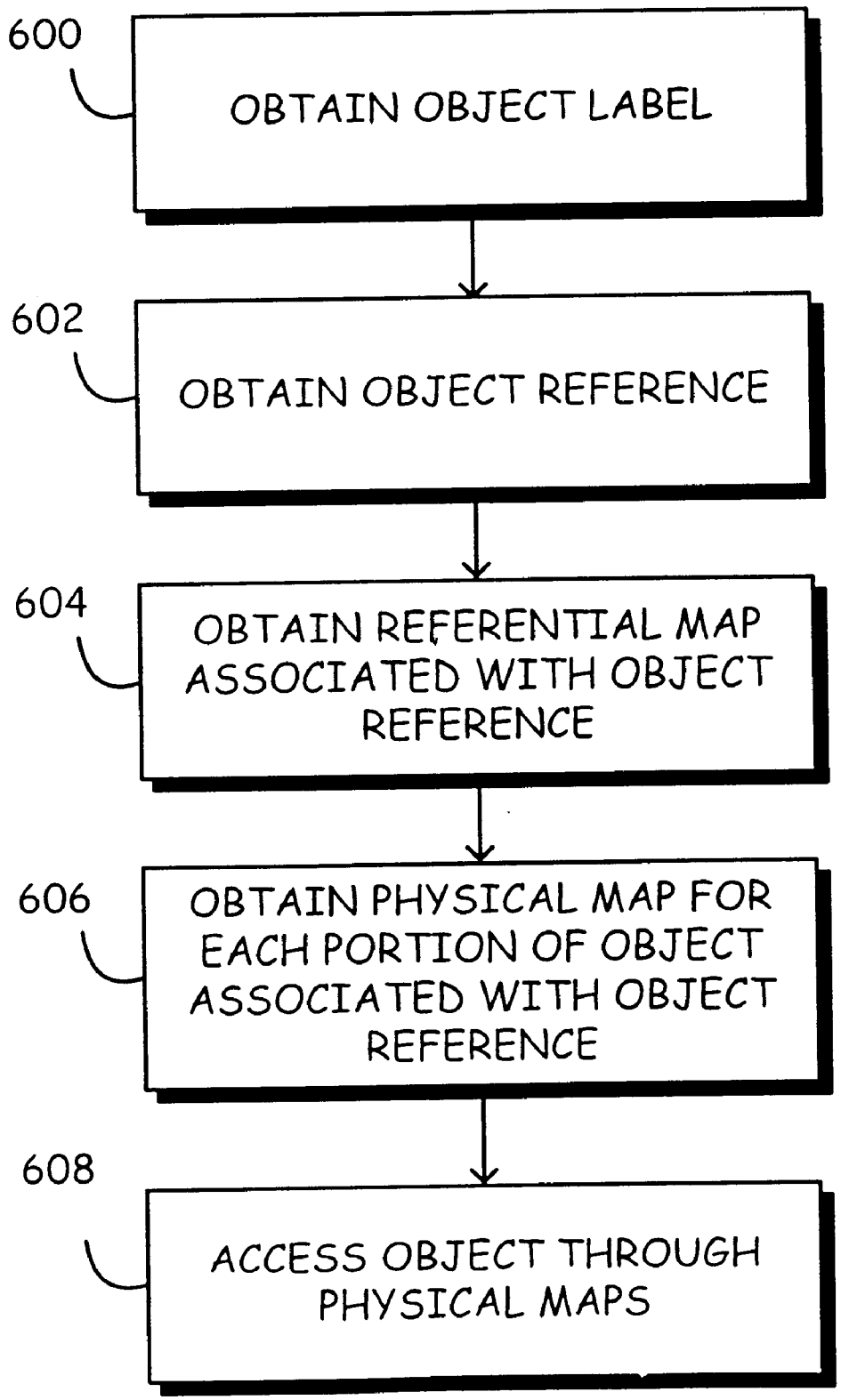
FIG. 6 shows a memory access method in accordance with one embodiment of the invention.

A method to access an object using referential and physical maps in accordance with one embodiment of the invention is illustrated in FIG. 6. Initially an object's label or filename is obtained (block 600) and translated to an object reference or handle in any convenient manner (block 602). (Label to reference translation is often referred to as a "lookup" operation). Having obtained an object's handle, the object's referential map is obtained (block 604). An object's referential map may generally be one element of that object's directory entry so that a directory lookup on an object's handle retrieves that object's referential map. As characterized above, a referential map describes how an object is distributed to one or more IOMs, where each of the one or more IOMs is responsible for managing the physical storage for a part of the object. No information regarding the physical storage characteristics of an object is included in a referential map.

Having identified those IOMs associated with an object, the physical maps for each of the object's distributed portions may be obtained (block 606). Specifically, one or more physical maps may be obtained from each of the IOMs identified in the object's referential map. Access to each portion of an object is then provided by an IOM in accordance with the physical map associated with that IOM (block 608).

It will be recognized that less than an entire object may be accessed. For example, the nth 32 kilobyte block of an object may be accessed by: identifying one or more IOMs responsible for the physical storage of the nth 32 kilobyte block (via the referential map obtained during the acts of block 604); retrieving the relevant physical maps; and accessing physical memory in accordance with those physical maps.

Figure 7A:
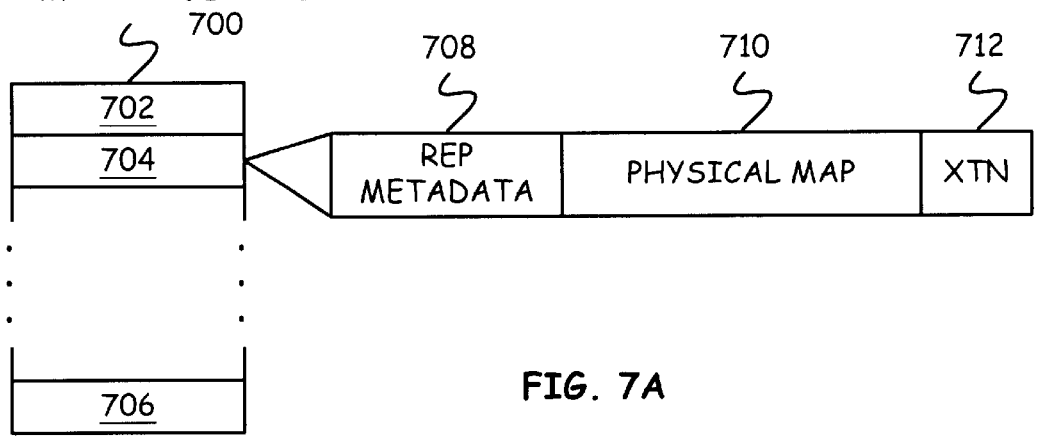
FIGS. 7A, 7B, and 7C illustrate object metadata structures that an input-output manager may use to identify an object's physical map in accordance with one embodiment of the invention.
Figure 7B:
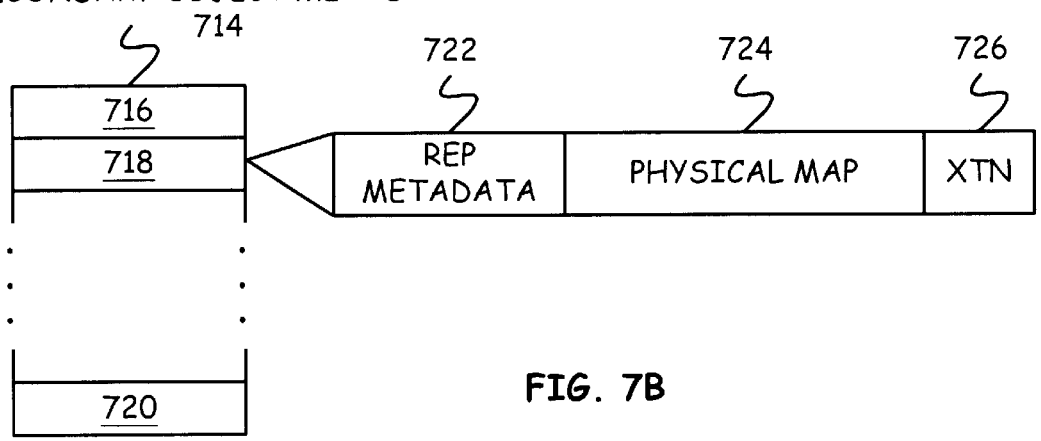

One mechanism by which an IOM may translate an object's reference to a physical map uses a handle that provides an indication of the object's starter IOM and an index into the starter IOM's primary object metadata. An object's starter IOM is that IOM at which the object's initial portion (e.g., an object's "start of file") is stored. For example, if object A is distributed across IOMs 1 through 5, and the first quantum of object A is physically located in memory allocated and controlled/managed by IOM-3, then IOM-3 is said to be object A's starter IOM. An IOM's primary object metadata associates an object's handle with a physical map. An IOM maintains primary object metadata for only those objects (or portions of objects) stored in memory allocated to and managed by the IOM. Each IOM also maintains secondary object metadata for those objects (or portions of objects) stored in memory allocated to and managed by the IOM but for which it is not the starter IOM. Primary and secondary metadata may be retained in data stores associated with each IOM (e.g., component 326 in FIG. 3) which may include volatile and/or non-volatile memory. In one embodiment, each IOM maintains primary and secondary object metadata in table form as shown in FIGS. 7A and 7B.

Each IOM's primary object metadata table 700 includes one entry (e.g., 702, 704, and 706) for each object for which it is the starter IOM. Typically, each entry in primary metadata table 700 is a fixed size, and includes replicated metadata field 708, physical map field 710, and extension field 712. Replicated metadata field 708 includes a copy of an object's referential map information. Physical map filed 710 associates one or more physical storage block on a storage device with that portion of the object associated with primary metadata object table entry 704. Thus, each physical map may itself include multiple entries. Extension field 712 indicates if an object's physical map exceeds a length allowed by the size of physical map field 710. For example, extension field 712 may be assigned a null or zero value if all of an object's physical storage (managed by an IOM) may be indicated within the space allocated to physical map field 710. If, however, an object's physical map requires more storage block indications than may be included in fixed size physical map entry 710, extension field 712 may indicate a file in which the object's physical map is continued.

Each IOM's secondary object metadata table 714 includes one entry (e.g., 716, 718, and 720) for each object for which it manages physical memory associated with the object (or part thereof) and for which it is not the starter IOM. Each entry in secondary object metadata table 714 includes the same information as does an entry in the primary metadata table 700: replicated metadata field 722; physical map field 724; and extension field 726.

Figure 7C:
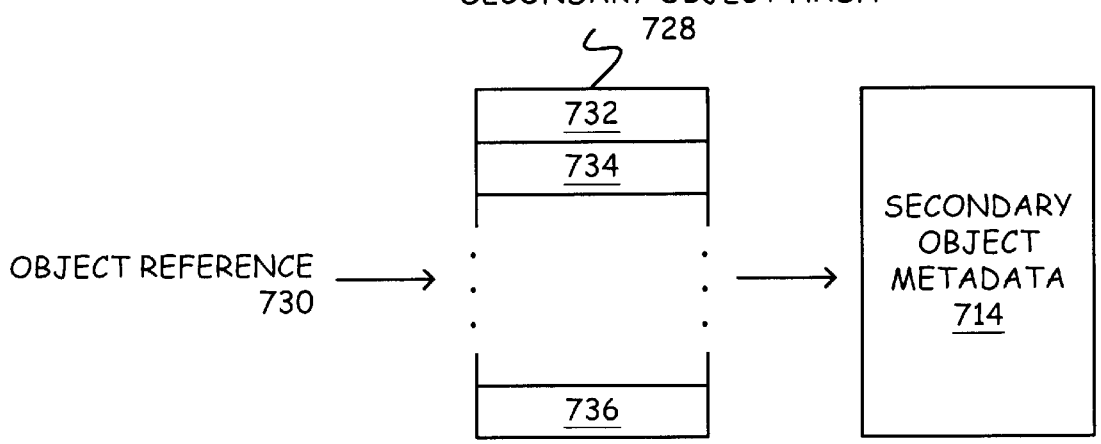

Referring to FIG. 7C, each IOM also maintains a secondary object hash structure 728 to facilitate object reference to secondary object metadata table lookup. As noted above, an object's unique reference or handle provides an indication of the object's starter IOM and index into the starter IOM's primary object metadata 700. Thus, if an IOM is not an object's starter IOM, the object's reference 730 provides no direct indication of where the object's physical map is located. By hashing on object reference 730, a unique entry in secondary object hash structure 728 may be determined (e.g., 732, 734, and 736) which, in turn, identifies a unique entry and physical map in secondary object metadata 714. In one embodiment secondary hash structure 728 may be implemented as a B-tree. In another embodiment, secondary hash structure 728 may be implemented as a link-list structure. In yet another embodiment, secondary hash structure 728 may be implemented as a dynamically resizable array.

Figure 8:
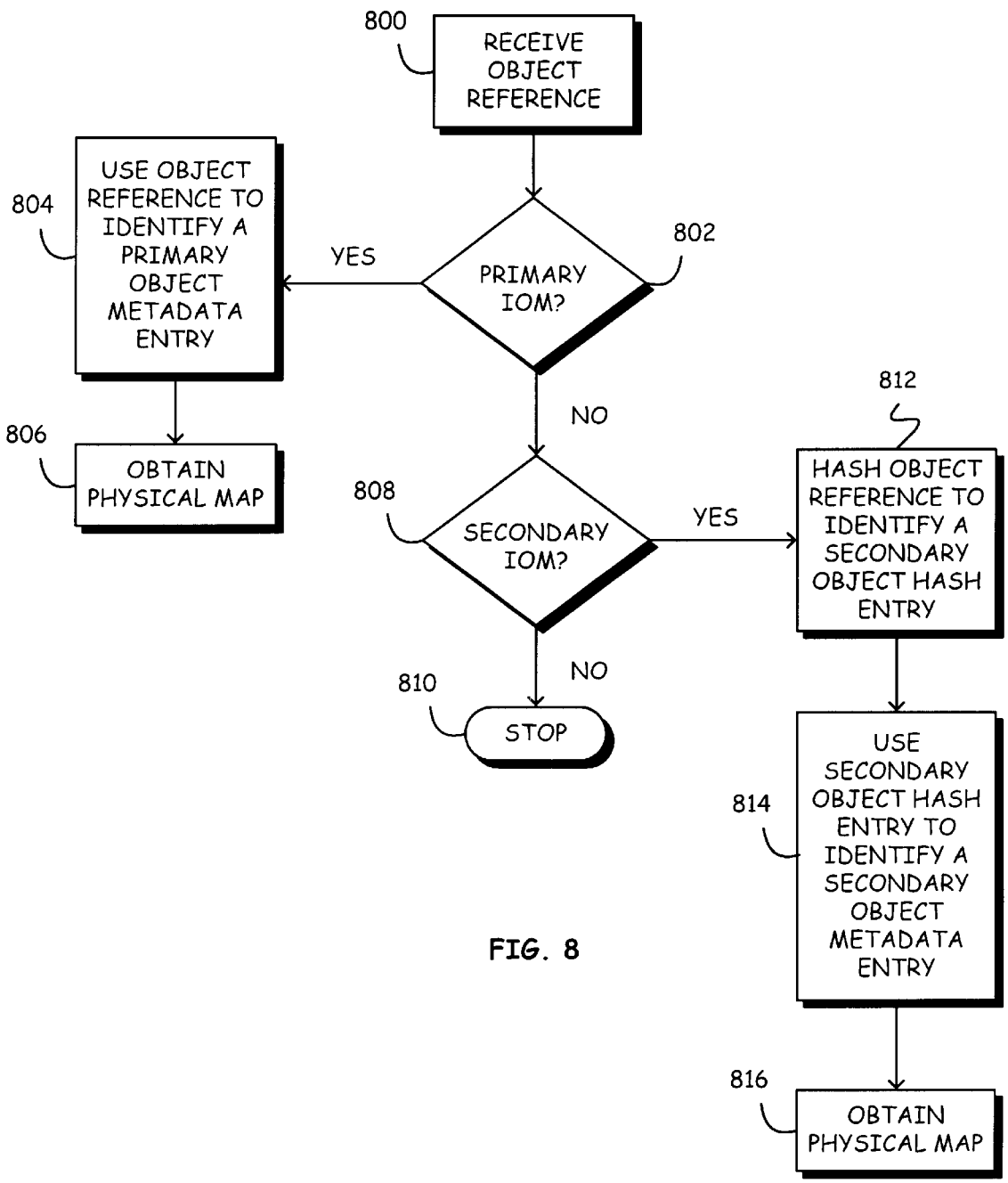
FIG. 8 illustrates a method in accordance with one embodiment of the invention by which an input-output manager identifies a physical map using the metadata structures of FIGS. 7A, 7B and 7C.

A technique in accordance with one embodiment of the invention by which an IOM identifies a physical map using the metadata structures of FIGS. 7A, 7B and 7C is shown in FIG. 8. First, the IOM receives an object reference or handle (block 800). If the IOM is the object's primary IOM (the "yes" prong of diamond 802), the object reference is used to directly identify an entry in the IOM's primary object metadata (block 804). The relevant physical map may then be obtained from the identified metadata entry (block 806). If the IOM is not the object's primary IOM (the "no" prong of diamond 802), and the IOM is not a secondary IOM for the object (the "no" prong of diamond 808), processing may stop as the IOM has no information regarding the object (block 810). If the IOM is a secondary IOM for the object (the "yes" prong of diamond 808), the object reference is hashed to identify a secondary object hash entry (block 812). Based on the identified secondary object hash entry, an entry in the secondary object metadata is identified (block 814). The relevant physical map may then be obtained from the identified metadata entry (block 816).

Figure 9:
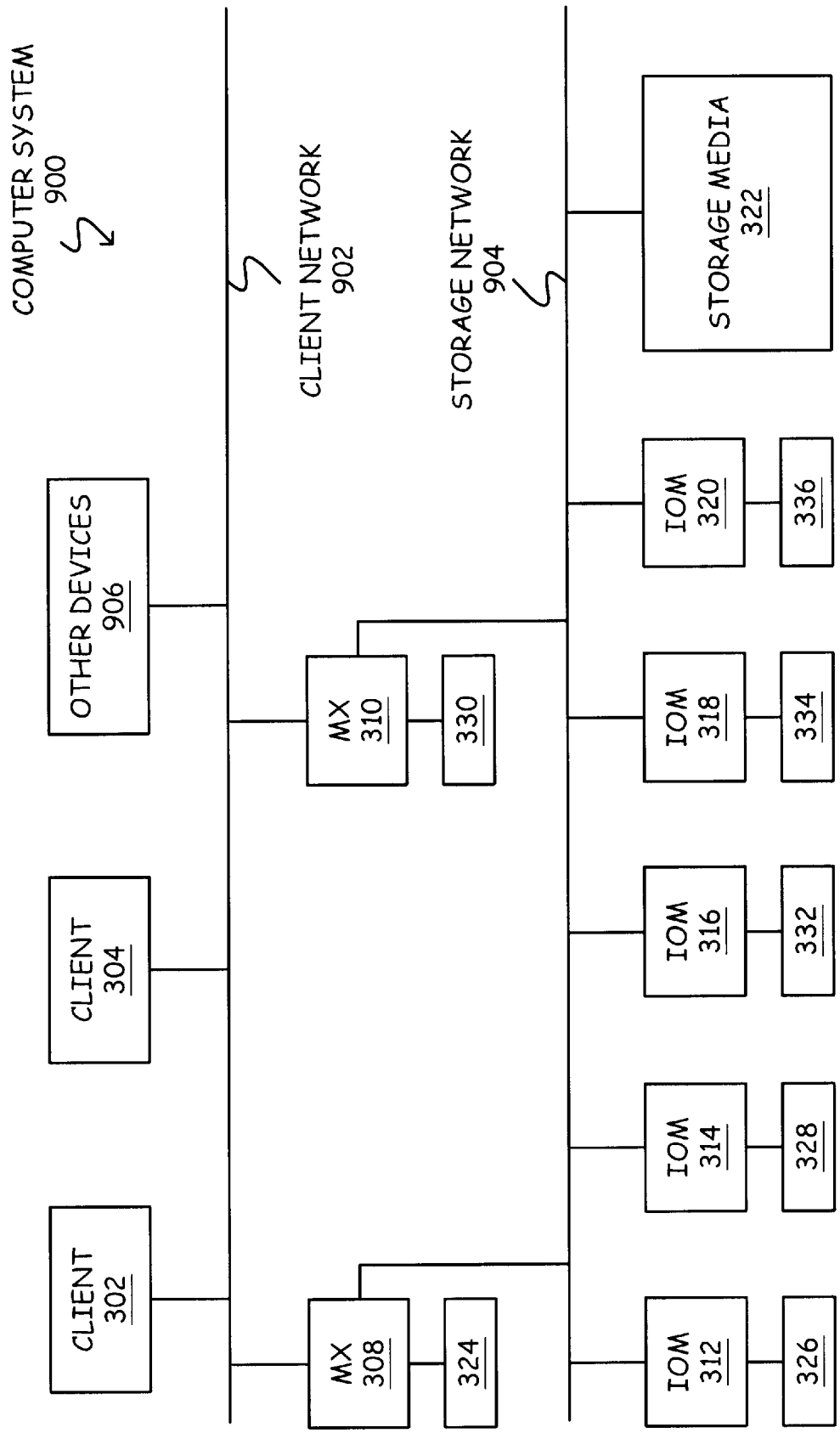
FIG. 9 shows an alternative embodiment for a computer system having distributed system storage.

It will be recognized that a computer system to provide distributed system storage in accordance with the invention may be implemented via architectures different from that shown in FIG. 3. For example, FIG. 9 shows an alternative computer system 900 that employs two networks: client communication network 902 and storage communication network 904. In this embodiment, client data traffic is segregated from storage system data traffic. That is, each client may communicate with another client, a MX, or another device 906 (e.g., a printer device) without interrupting or being interrupted by data transfer operations between one or more IOMs. It will be further recognized that each of client network 902 and storage network 904 may include one or more physical networks and may, furthermore, be implemented using any desired technology. In addition, the implementation of client network 902 and storage network 904 may be independent of one another.

Typically, MX and/or IOMs are embodied in one or more program modules or routines for execution by a programmable control device. Illustrative storage devices suitable for tangibly embodying MX and/or IOM program modules include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks. Illustrative programmable control devices include a single computer processor, a plurality of computer processors coupled by one or more communication links, or a custom designed state machine. Custom designed state machines may be embodied in a hardware device such as a printed circuit board comprising discrete logic, integrated circuits, specially designed application specific integrated circuits (ASICs), or field programmable gate arrays.

Figure 10:
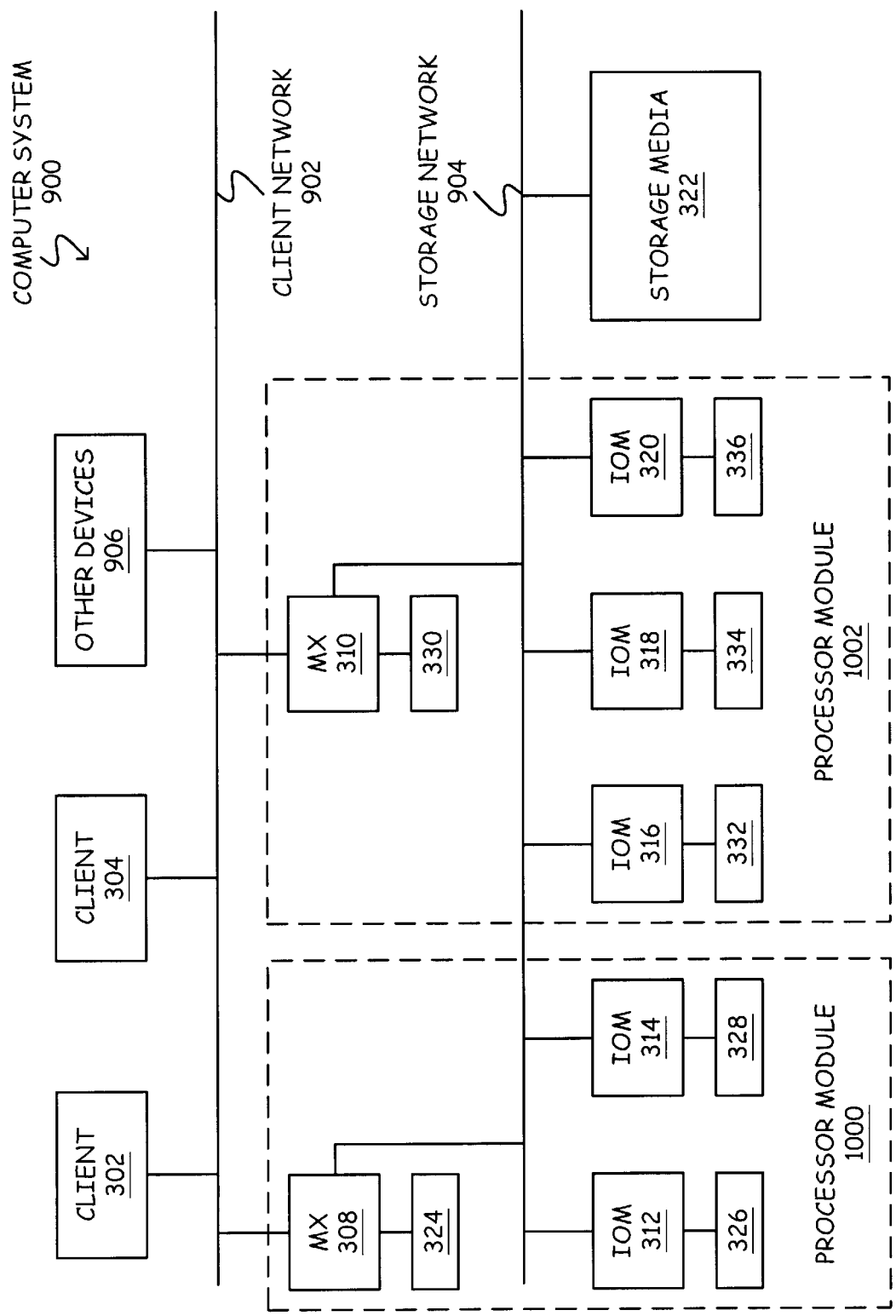
FIG. 10 shows a hardware partitioning of the computer system of FIG. 9 in accordance with one embodiment of the invention.

Referring to FIG. 10, the computer system of FIG. 9 is shown as including processor modules 1000 and 1002 as well as client devices 302, 304, other devices 904, and storage media 322. Each of processor modules 1000 and 1002 includes at least one programmable control device which is designed to execute MX and IOM routines. In a similar manner, each client 302 and 304 may be an independent computer system such as, for example, special or general purpose workstations including multiprocessing systems.

As described herein, MX and IOM objects act independently from and without reliance on resources associated with other MX or IOM objects. Process independence and distributed storage enables a system in accordance with one embodiment of the invention to compensate for a failed MX and/or IOM through the use of proxy objects. For example (see FIG. 3), if IOM 316 is the designated proxy for IOM 312 and IOM 312 fails, IOM 316 may service those client requests directed to a stored object (or part thereof) managed by failed IOM 312 provided the necessary metadata and fault tolerance data (e.g., parity information) associated with IOM 312's data is available to proxy IOM 316. To facilitate the operational recovery of IOM 312, proxy IOM 316 modifies the data fault tolerance and metadata fault tolerance objects (e.g., files) associated with changes to the stored object which, before failure, would have been managed by IOM 312. An indication that the stored object's fault tolerance information has been modified is provided to IOM 312 when it is restarted, thereby allowing it to reconstruct those parts of the stored object's data and metadata which it manages so as to reflect the modifications made by its proxy IOM 316. Accordingly, distributed computer system storage in accordance with the invention provides storage management software that is self-repairing or self-healing in the face of software and/or hardware failures.

Figure 11:
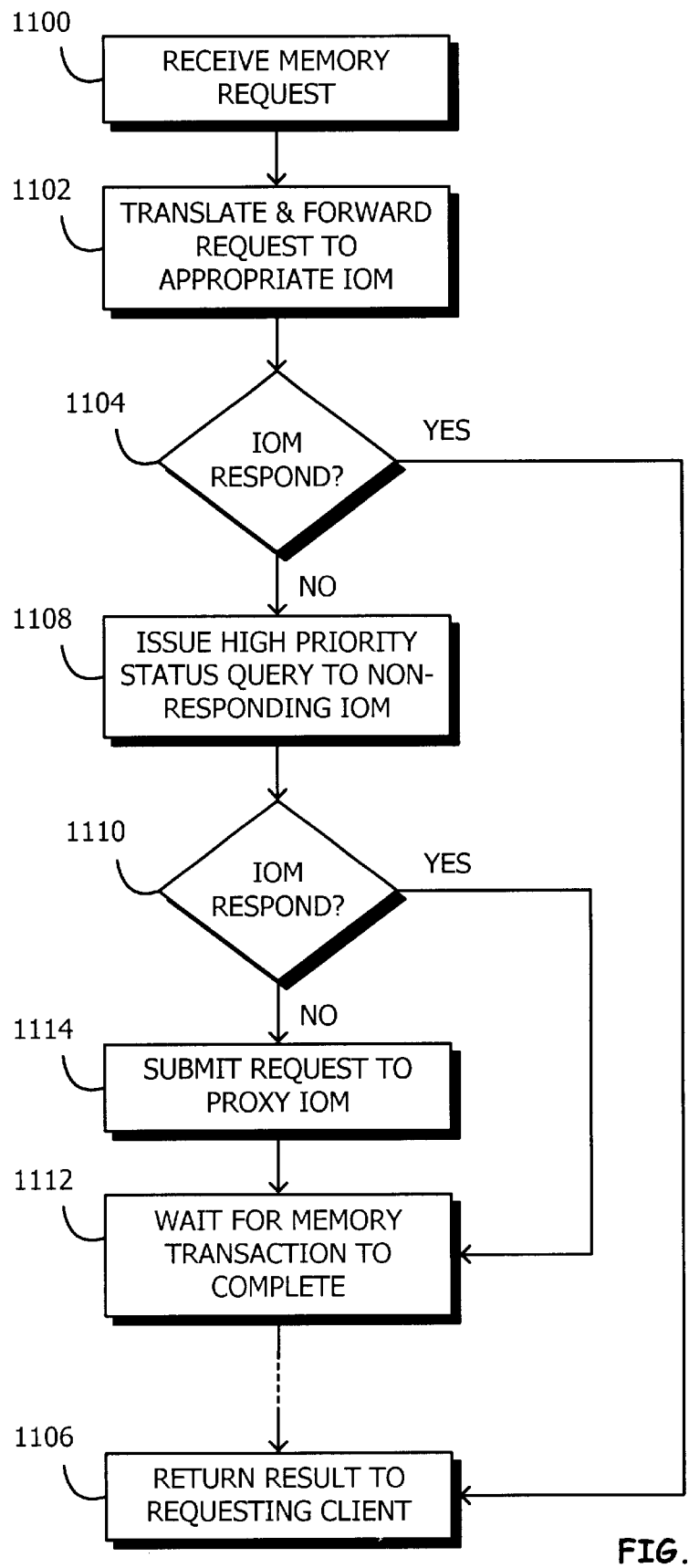
FIG. 11 shows a flowchart of how a memory translator initiates use of a proxy input-output manager in accordance with one embodiment of the invention.

Referring to FIG. 11, a flowchart of how a MX processes a memory transaction request in accordance with one embodiment of the invention is shown. A client-initiated memory transaction request directed to a stored object is received (block 1100) and forwarded to the one or more appropriate IOMs as described above (block 1102). If the targeted IOM responds (the "yes" prong of diamond 1104), the response is passed back to the requesting client (block 1106). If the target IOM does not respond within a specified time period (the "no" prong of diamond 1104), the MX may issue a high priority status query (e.g., a "ping" signal) to the non-responding IOM (block 1108). If the IOM responds to this second query (the "yes" prong of diamond 1110), the MX waits for the IOM to complete the memory request (block 1112), forwarding the response to the client when it is received (block 1106). If the targeted IOM fails to respond to the MX's second query within a specified time period (the "no" prong of diamond 1110), the MX assumes the targeted IOM has failed. In another embodiment, the MX may initiate multiple queries to a non-responsive IOM at block 1108 before proceeding with the acts of block 1114. In yet another embodiment, each IOM may issue periodic "heartbeat" signals to indicate to one or more MXs that they are operational; the lack of such a heartbeat signal for a specified period of time indicating the IOM has failed. In general, the combination of acts illustrated by blocks 1104, 1108 and 1110 are designed to distinguish between the case where an IOM is operational but slow to respond, and when it has failed. Thus, if an IOM is operational but slow to respond to a submitted memory access request, a MX may simply wait for the response. If an IOM fails to respond to either the access request or subsequent health status queries within a specified time period (to the access request, to one or more health status requests, or by failure to generate a heartbeat signal, for example), the IOM may be deemed failed. The time period used to distinguish between a slow responding and failed IOM is an operational parameter established by the designer. For example, health status or heartbeat signals may be sent or expected every 100 to 1,000 milliseconds; an IOM failing to respond or transmit the same for a continuous period of 1 to 4 seconds may be deemed to have failed.

Once an IOM is determined to have failed (the "no" prong of diamond 1110), the MX determines which IOM is the appropriate proxy, and submits the memory request to that IOM (block 1114). While many methodologies are possible, in one embodiment proxy IOM assignment relies on the sequential identification of input-output managers. For example, if IOMs 312 through 320 in FIG. 3 are identified as IOMs 1 through 5 respectively, then IOM-1's proxy may be IOM-2, IOM-2's proxy may be IOM-3, IOM-3's proxy may be IOM-4, IOM-4's proxy may be IOM-5, and IOM-5's proxy may be IOM-1. To further improve the ability of proxy IOM's to compensate for run-time failures, IOM proxy assignment may alternate, to the extent possible, across processor modules. Referring again to FIG. 10 for example, if IOM 312 is assigned the identifier 1, IOM 314 is temporarily skipped because it executes on the same processor module (module 1000) as does IOM 312. Instead, IOM 316 may be assigned the identifier 2, with the next assignment alternating back to processor module 1000. In this manner IOM 314 may be assigned the identifier 3, IOM 318 the identifier 4, and IOM 320 the identifier 5. Thus, if any one IOM fails (due to a software or hardware failure) there is a proxy IOM that is available to process the failed IOM's requests, provided those requests can be satisfied using metadata and fault tolerance data associated with the failed IOM and available to the proxy IOM (see discussion below regarding FIG. 12).

Following submission of the client's memory request to a proxy IOM (block 1114), the MX waits for the memory transaction to complete (block 1112), forwarding the result to the requesting client when received (block 1106).

Figure 12:
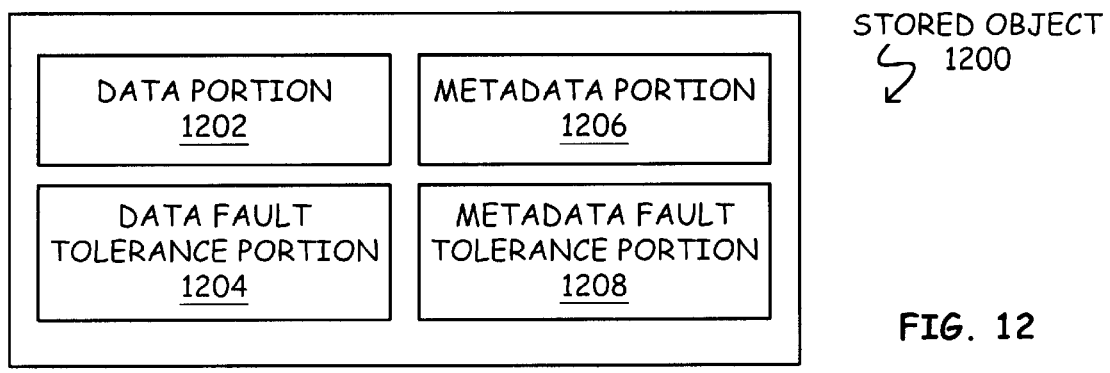
FIG. 12 shows that a stored object may comprise data, metadata and fault tolerance information portions.

As described herein, information related to a stored object may be divided into three parts or portions: a data portion; a metadata portion; and fault tolerance portions. The data portion represents the information content of the object, the text and formatting information within a word processing file for instance. The metadata portion includes the object's access information such as the stored object's physical map (or a part thereof), the level of fault tolerance assigned to the object, object length or size, time and date modification tags, and the like. The fault tolerance portions represent object protection information and may be associated with either or both of the data portion and the metadata portion. Referring to FIG. 12, for example, the composition of arbitrary stored object 1200 includes data portion 1202, data fault tolerance portion 1204, metadata portion 1206 and metadata fault tolerance portion 1208. As with data 1202 and metadata 1206 portions, data fault tolerance 1204 and metadata fault tolerance 1208 portions may be distributed across one or more IOMs. It will be recognized that not every stored object is required to have associated fault tolerance information. For example, a user or system administrator may choose not to protect some objects (e.g., text files, images, and database files). If an object has a fault tolerance portion, it is typically distributed to IOMs different from that which manage the related data and metadata portions. That is, if part of data 1202 and metadata 1206 portions are managed by IOM 314 (see FIG. 3 or 10), those parts of data fault tolerance 1204 and metadata fault tolerance 1208 portions associated with data and metadata managed by IOM 314 are distributed to a different IOM. In one embodiment, the "different" IOM is IOM 314's designated proxy. In another embodiment, the "different" IOM is yet another IOM accessible by IOM 314's designated proxy. Illustrative fault tolerance information include RAID (redundant arrays of independent disks) technology level 1 (disk mirroring), level 3 (parity saved to a dedicated disk), or level 5 (parity data dispersed with object data) information. The ability of a proxy IOM to service requests issued to a failed IOM depends, in part, on the level of protection afforded to a stored object's data and metadata.

In addition to maintaining stored objects, each IOM has an associated contents object and a contents parity object. A contents object includes the information (metadata) needed to access all of the metadata (and, therefore, the data) managed by the IOM. The contents parity object includes fault tolerance information that will allow the reconstruction of the contents object should the contents object become corrupt or unavailable. As with other stored objects, the contents parity object is typically stored and managed by IOMs other than that to which the contents object is associated. (In one embodiment, for example, contents parity objects are mirrored.) Each IOM generally knows where its contents parity object is stored (i.e., at what IOM) so that it may be retrieved and used during IOM startup operations (see discussion below). Further, each IOM generally knows where the contents parity object of the IOM for which it is a designated proxy is stored so that it may be retrieved and used during failed IOM operations (see discussion below).

Figure 13B:
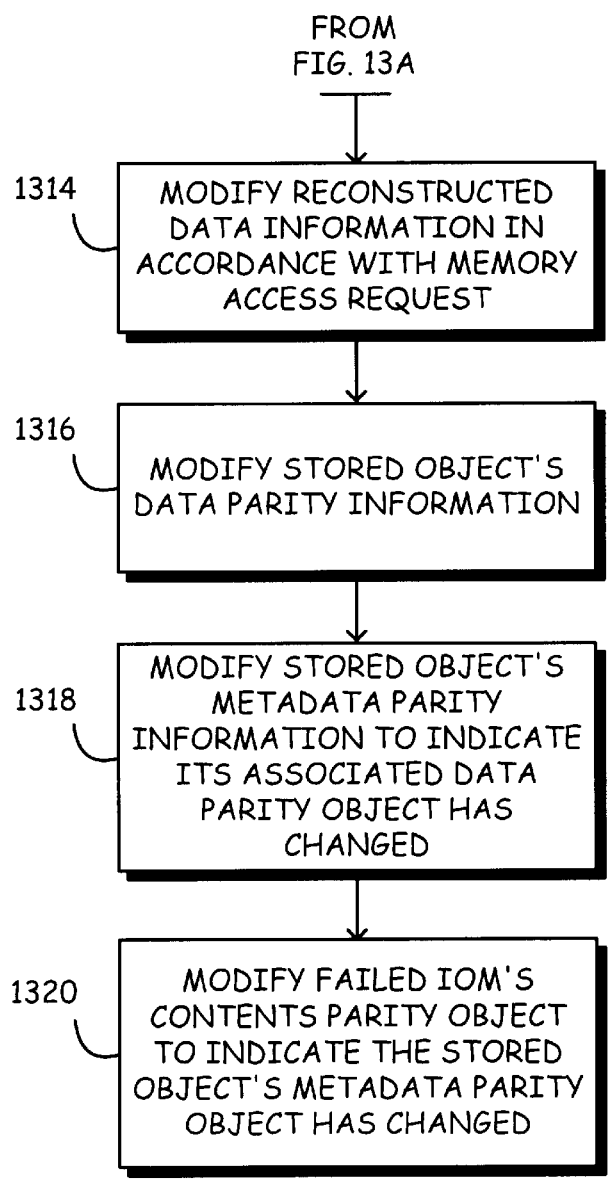
FIGS. 13A and 13B show a flowchart of how a proxy input-output manager processes a memory transaction request received in accordance with FIG. 11.
Figure 13A:
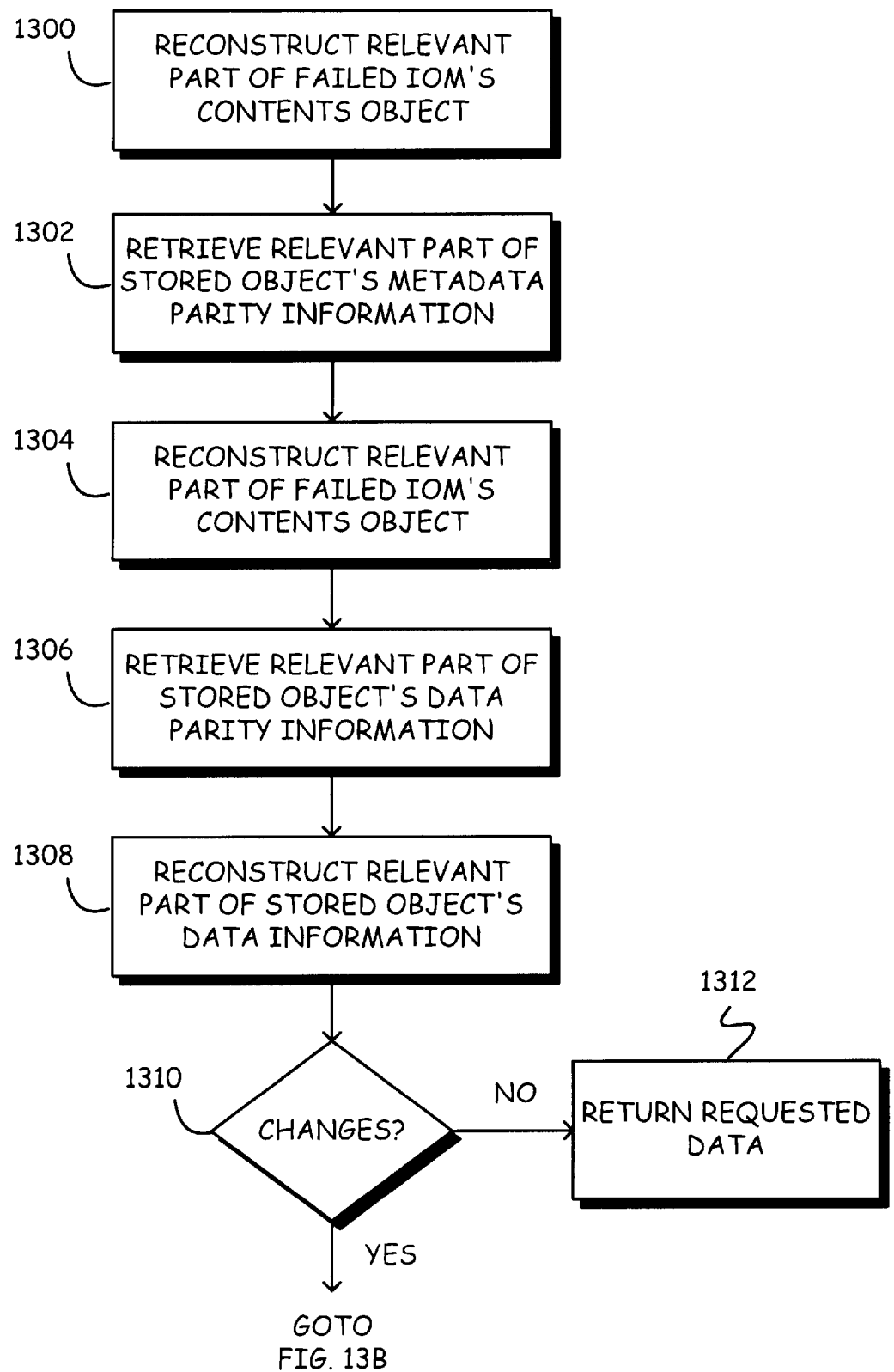

Referring to FIGS. 13A and 13B, an illustrative flowchart of how a proxy IOM processes the memory transaction request received in accordance with block 1114 of FIG. 11 is shown. Initially, the proxy IOM reconstructs the relevant part of the failed IOM's contents object by retrieving and using the relevant part(s) of the failed IOM's contents parity object (block 1300). From the reconstructed contents information, the relevant part of the stored object's metadata parity portion is retrieved (block 1302) and the corresponding part of the metadata information is reconstructed (block 1304). From the reconstructed metadata information, the relevant part of the stored object's data parity portion is retrieved (block 1306) and the corresponding part of the stored object's data are reconstructed (block 1308).

If the requested memory transaction does not require a change to the stored object's data (the "no" prong of diamond 1310), the proxy IOM returns the requested data to the user via, for example, the appropriate MX (block 1312). If the requested memory transaction requires a change to the stored object's data (the "yes" prong of diamond 1310), the proxy IOM makes the changes to the reconstructed data information (block 1314) and also modifies the stored object's data parity portion to reflect the changes (block 1316). It will be recognized that changes to the stored object's data parity portion typically occur as a result of "store" operation on the reconstructed data information. It will also be recognized that the stored object's data parity portion may or may not be managed by the proxy IOM.

In addition to modifying the stored object's data parity portion, the proxy IOM causes the stored object's metadata parity portion to be modified to indicate that the stored object's data parity portion has been modified (block 1318). In one embodiment, this may be accomplished by setting a value (e.g., a flag) in the reconstructed metadata information and then causing this change to be pushed into the stored object's metadata parity portion by a "save" operation. Following, or concurrent with, setting a value in the stored object's metadata parity portion, the proxy IOM sets a value in the failed IOM's contents parity object to indicate the stored object's metadata parity portion has been modified (block 1320). As with the metadata parity portion, this may be accomplished by setting a value (e.g., a flag) in the reconstructed contents information and then causing this change to be pushed into the failed object's contents parity object by a "save" operation. Acts in accordance with FIGS. 13A and 13B are repeated as needed to respond to a memory transaction request. In one embodiment, the value set in the stored object's metadata parity portion comprises a variable or flag field associated with the stored object's physical map. For example, a "modified" flag associated with element 710 of FIG. 7A or element 724 in FIG. 7B. Changes may be indicated by a first value (e.g., non-zero), while no changes are indicated by a second value (e.g., zero). Similarly, the failed IOM's contents parity object may have a modification indicator field associated with the metadata entry for the specific stored object that was modified.

Figure 14:
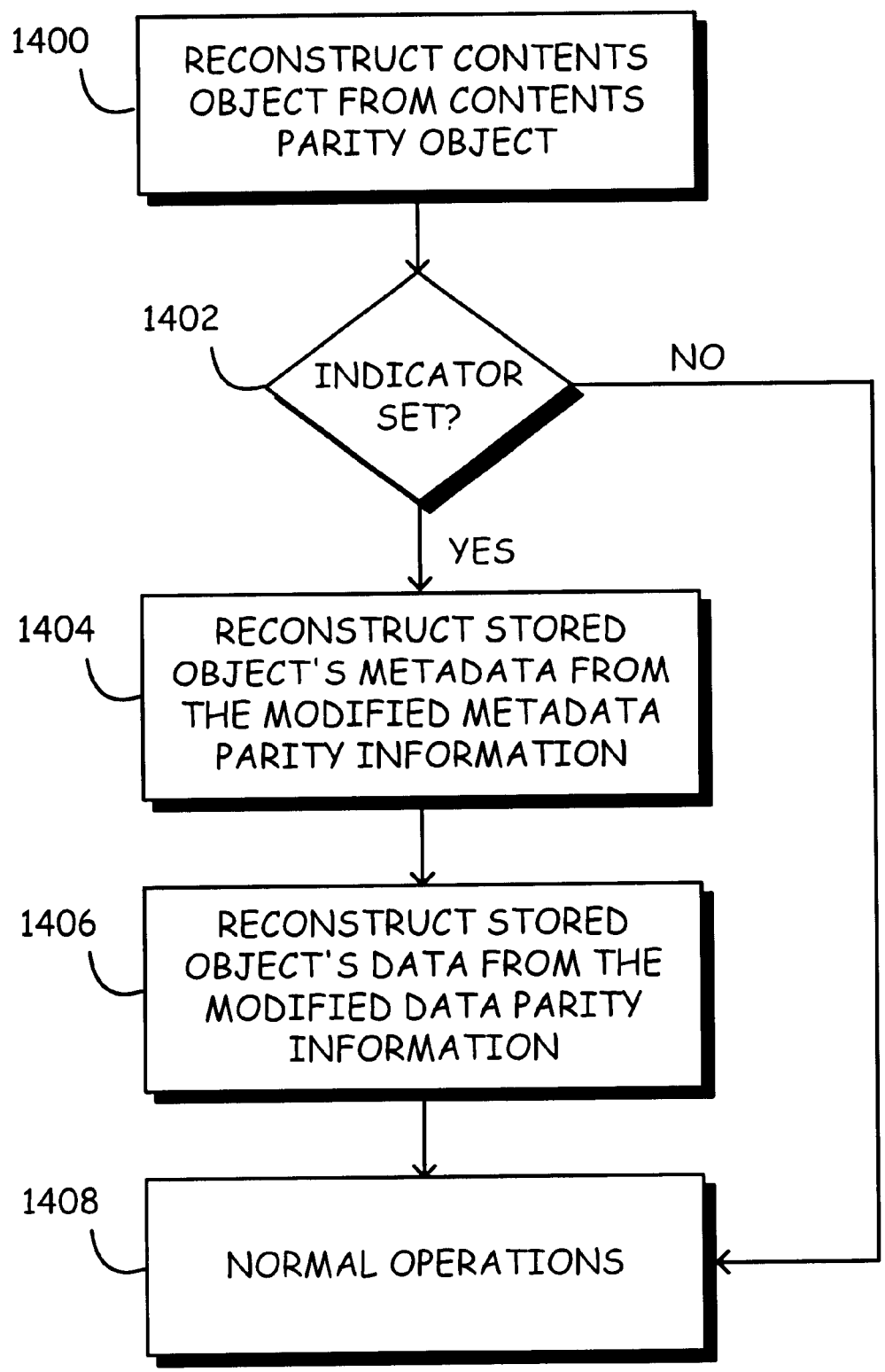
FIG. 14 shows a restart procedure for a previously failed input-output manager in accordance with one embodiment of the invention.

Referring now to FIG. 14, an IOM restart procedure making use of the indications set in accordance with FIG. 13 is shown. On start-up (e.g., a restart operation), the previously failed IOM reconstructs its contents object from the contents object's parity object (block 1400). If the contents object does not contain a value indicating a stored object's metadata parity portion has been modified (the "no" prong of diamond 1402), the restarting IOM begins normal operations (block 1408). If the contents object contains a value indicating a stored object's metadata parity portion has been modified (the "yes" prong of diamond 1402), the stored object's metadata is reconstructed from the object's modified metadata parity portion (block 1404). Next, the stored object's data is reconstructed from the object's modified data parity portion (block 1406). With the stored object's reconstructed metadata and data portions now reflecting the changes made by the proxy IOM, normal operations may resume (block 1408). It is significant to note that the restarted IOM reconstructs only those parts of the stored object which it manages (recall, each IOM may only have knowledge of and access to a part of a stored object).

It will be recognized that many software errors (bugs) are triggered by the confluence of a number of actions, the totality of which create an error state that cannot be predicted a priori. That is, many software bugs are intermittent causing applications/processes fail under unusual and unpredictable circumstances. A computer storage system in accordance with the invention may compensate for these intermittent and unforeseen errors by providing continuous access to and use of the stored object's data via manipulation of the object's data and metadata parity information. In addition, a storage system in accordance with the invention provides an automatic and transparent technique for incorporating changes made to a stored object by a proxy when the failed IOM is restarted.

It will be recognized by those of ordinary skill in the art of computer file system design, that the use of proxies can be applied equally to memory translator (MX) processes. For example, each MX process (e.g., 308 and 310 in FIGS. 3, 9 and 10) may have a designated proxy MX. In one embodiment, each MX process may be assigned a numeric label on creation (similar to an IOM), wherein the next consecutive MX is a designated proxy. In another embodiment, a MX process may signal a designated MX that it is sending a file system command to one or more IOM's. On completion of the memory transaction the initiating MX could send a "transaction complete" message to its proxy MX. If at any time a MX that initiates a memory transaction fails to send a "transaction complete" message to its proxy MX within a specified time period, the proxy MX may assume the originating MX has failed and follow the procedure outlined in FIG. 11.

Various changes in the materials, components, circuit elements, as well as in the details of the illustrated operational methods are possible without departing from the scope of the claims. Thus, while the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A method to process a memory access request by a storage management process, the memory access request directed to a stored object having a data portion, a data fault tolerance portion, a metadata portion and a metadata fault tolerance portion, the method comprising:

reconstructing at least a part of the metadata portion in accordance with at least a part of the metadata fault tolerance portion;

locating at least a part of the data fault tolerance portion based on the reconstructed metadata part;

reconstructing a part of the data portion corresponding to the located data fault tolerance part;

modifying the reconstructed data part;

modifying the data fault tolerance portion in accordance with the modified reconstructed data part;

indicating in the metadata fault tolerance portion that the data fault tolerance portion has been modified; and modifying a contents object to indicate the metadata fault tolerance portion has been modified, the contents object associated with a second storage management process distinct from the storage management process.

2. The method of claim 1, wherein the act of reconstructing at least a part of the metadata portion comprises:

obtaining at least a part of the metadata fault tolerance portion; and reconstructing the metadata part based on the obtained part of the metadata fault tolerance portion.

3. The method of claim 2, wherein the obtained metadata fault tolerance part is obtained from one or more physical storage units managed by the storage management process.

4. The method of claim 2, wherein the obtained metadata fault tolerance part is obtained from one or more physical storage units not managed by the storage management process.

5. The method of claim 1, wherein the act of reconstructing at least a part of the data portion comprises:

obtaining at least a part of the data fault tolerance portion; and reconstructing the data part based on the obtained part of the data fault tolerance portion.

6. The method of claim 5, wherein the obtained data fault tolerance part is obtained from one or more physical storage units managed by the storage management process.

7. The method of claim 5, wherein the obtained data fault tolerance part is obtained from one or more physical storage units not managed by the storage management process.

8. The method of claim 1, wherein the act of modifying the data fault tolerance portion is initiated by the act by storing the modified data part.

9. The method of claim 1, wherein the act of indicating the data fault tolerance portion has been modified in the metadata fault tolerance portion comprises:

setting a value in the reconstructed metadata part, the value associated with a storage location map, the storage location map identifying a physical storage location for that part of the data portion corresponding to the modified data part; and modifying the metadata fault tolerance portion in accordance with the value set in the reconstructed metadata part.

10. The method of claim 1, wherein the act of modifying a contents object comprises modifying a fault tolerance object associated with the contents object to indicate the metadata fault tolerance portion of the stored object has been modified.

11. The method of claim 10, wherein the act of modifying a fault tolerance object associated with the contents object comprises:

reconstructing at least a part of the contents object from the fault tolerance object;

setting a value in the reconstructed contents object part;

modifying the fault tolerance object in accordance with the modified reconstructed part of the contents object.

12. The method of claim 11, wherein the act of reconstructing at least a part of the contents object from the fault tolerance object comprises:

locating the fault tolerance object associated with the contents object;

obtaining at least a part of the fault tolerance object, the obtained part corresponding to the contents object associated with the modified metadata fault tolerance portion.

13. A program storage device, readable by a programmable control device, comprising instructions for causing the programmable control device to execute a storage management routine to process a memory access request, the memory access request directed to a stored object having a data portion, a data fault tolerance portion, a metadata portion and a metadata fault tolerance portion, the instructions including instructions to:

reconstruct at least a part of the metadata portion in accordance with at least a part of the metadata fault tolerance portion;

locate at least a part of the data fault tolerance portion based on the reconstructed metadata part;

reconstruct a part of the data portion corresponding to the located data fault tolerance part;

modify the reconstructed data part;

modify the data fault tolerance portion in accordance with the modified reconstructed data part;

indicate in the metadata fault tolerance portion that the data fault tolerance portion has been modified; and modify a contents object to indicate the metadata fault tolerance portion has been modified, the contents object associated with a storage management process distinct from the storage management process.

14. The program storage device of claim 13, wherein the instructions to obtain the metadata fault tolerance part comprise instructions to obtain the metadata fault tolerance part from one or more physical storage units not managed by the storage management routine.

15. The program storage device of claim 13, wherein the instructions to obtain the data fault tolerance part comprise instructions to obtain the data fault tolerance part from one or more physical storage units managed by the storage management routine.

16. The program storage device of claim 13, wherein the instructions to indicate the data fault tolerance portion has been modified in the metadata fault tolerance portion comprise instructions to:

set a value in the reconstructed metadata part, the value associated with a storage location map, the storage location map identifying a physical storage location for that part of the data portion corresponding to the modified data part; and modify the metadata fault tolerance portion in accordance with the value set in the reconstructed metadata part.

17. The program storage device of claim 13, wherein the instructions to modify the contents object comprise instructions to modify a fault tolerance object associated with the contents object to indicate the metadata fault tolerance portion of the stored object has been modified.

18. A method to initialize a storage management process comprising:

reconstructing a contents object based on a contents fault tolerance object, the contents object associated with the storage management process;

determining a value of an object-modified indicator in the reconstructed contents object, the object-modified indicator associated with a stored object, the stored object having a data portion and a data fault tolerance portion; and reconstructing at least a part of the data portion based on at least a part of the data fault tolerance portion if the object-modified indicator has a first value.

19. The method of claim 18, wherein the act of reconstructing a contents object comprises retrieving the contents fault tolerance object from a second, different, storage management process.

20. The method of claim 18, wherein the act of determining a value of an object-modified indicator comprises determining the value of a variable associated with a physical map of at least a part of the stored object.

21. The method of claim 18, wherein the act of reconstructing at least a part of the data portion comprises:

obtaining a metadata object associated with the at least a part of the data portion, the metadata object indicating a storage location of the at least a part of the data fault tolerance portion;

obtaining the at least a part of the data fault tolerance portion; and reconstructing the at least a part of the data portion based on the obtained data fault tolerance portion.

22. The method of claim 21, wherein the act of obtaining a metadata object comprises:

obtaining a metadata fault tolerance object based on the reconstructed contents object; and reconstructing the metadata object based on the obtained metadata fault tolerance object.

23. The method of claim 18, wherein the storage management process and the second storage management process execute on different processors.

24. A program storage device, readable by a programmable control device, comprising instructions for causing the programmable control device to start a storage management routine, the instructions including instructions to:

reconstruct a contents object based on a contents fault tolerance object, the contents object associated with one or more stored objects managed by the storage management process;

determine a value of an object-modified indicator in the reconstructed contents object, the object-modified indicator associated with a stored object, the stored object having a data portion and a data fault tolerance portion; and reconstruct at least a part of the data portion based on at least a part of the data fault tolerance portion if the object-modified indicator has a first value.

25. The program storage device of claim 24, wherein the instructions to reconstruct a contents object comprise instructions to retrieve the contents fault tolerance object from a second, different, storage management process.

26. The program storage device of claim 24, wherein the instructions to determine a value of a n object-modified indicator comprise instructions to determine the value of a variable associated with a physical map of at least a part of the stored object.

27. The program storage device of claim 24, wherein the instructions to reconstruct at least a part of the data portion comprise instructions to:

obtain a metadata object associated with the at least a part of the data portion, the metadata object indicating a storage location of the at least a part of the data fault tolerance portion;

obtain the at least a part of the data fault tolerance portion; and reconstruct the at least a part of the data portion based on the obtained data fault tolerance portion.

28. The program storage device of claim 27, wherein the instructions to obtain a metadata object comprise instructions to:

obtain a metadata fault tolerance object based on the reconstructed contents object; and reconstruct the metadata object based on the obtained metadata fault tolerance object.

29. The program storage device of claim 24, wherein the storage management process and the second storage management process execute on different programmable control devices.

* * * * *